(12) United States Patent
Takemoto et al.

(10) Patent No.: US 10,921,292 B2
(45) Date of Patent: Feb. 16, 2021

(54) SUPERSONIC INSPECTION JIG AND SUPERSONIC INSPECTION METHOD

(71) Applicant: MITSUBISHI HEAVY INDUSTRIES, LTD., Tokyo (JP)

(72) Inventors: Hiroshi Takemoto, Tokyo (JP); Yoshiharu Kuze, Tokyo (JP); Mitsuyoshi Uematsu, Tokyo (JP); Seiji Kobayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 52 days.

(21) Appl. No.: 16/092,243

(22) PCT Filed: Apr. 11, 2017

(86) PCT No.: PCT/JP2017/014796
§ 371 (c)(1),
(2) Date: Oct. 9, 2018

(87) PCT Pub. No.: WO2017/179567
PCT Pub. Date: Oct. 19, 2017

(65) Prior Publication Data
US 2019/0094187 A1 Mar. 28, 2019

(30) Foreign Application Priority Data
Apr. 14, 2016 (JP) .............................. JP2016-081170

(51) Int. Cl.
G01N 29/28 (2006.01)
G01N 29/265 (2006.01)
(Continued)

(52) U.S. Cl.
CPC ......... *G01N 29/265* (2013.01); *G01N 29/043* (2013.01); *G01N 29/221* (2013.01);
(Continued)

(58) Field of Classification Search
CPC ............ G01N 29/2487; G01N 29/043; G01N 29/265; G01N 2291/044; G01N 2291/101;
(Continued)

(56) References Cited

U.S. PATENT DOCUMENTS 5,708,208 A 1/1998 Bonitz
8,286,487 B2 * 10/2012 Kollgaard ............ G01N 29/225
73/598

(Continued)

FOREIGN PATENT DOCUMENTS

GB 2036321 A 6/1980
JP S57198863 A 12/1982
(Continued)

OTHER PUBLICATIONS

Extended European Search Report for European Application No. 17782380.4 dated Jan. 21, 2019; 9pp.
IPRP of International Application No. PCT/JP2017/014796 dated Oct. 25, 2018; 6pp.

*Primary Examiner* — Brandi N Hopkins
(74) *Attorney, Agent, or Firm* — Kanesaka Berner and Partners LLP (57) ABSTRACT

A supersonic inspection jig has an insertion section 22 inserted into a hole 10 of an inspection target 1, and a flange section 23 connected with the insertion section 22 and contacting the inspection target 1. The flange section 23 has a flange section first surface 231 which is a surface on the side contacting the inspection target 1 and a flange section second surface 232 which is a surface on the side contacting the probe 41. A position limiting section 26 is provided on the flange section second surface 232 to limit the position of the probe 41 so that the probe 41 is maintained in a position separate from a central axis C of the hole 10. Thus, the inspection around the hole becomes easily executable.

10 Claims, 9 Drawing Sheets

(51) Int. Cl.
*G01N 29/24* (2006.01)
*G01N 29/04* (2006.01)
*G01N 29/22* (2006.01)

(52) U.S. Cl.
CPC ..... *G01N 29/2462* (2013.01); *G01N 29/2487* (2013.01); *G01N 29/28* (2013.01); *G01N 2291/0231* (2013.01); *G01N 2291/0232* (2013.01); *G01N 2291/0235* (2013.01); *G01N 2291/044* (2013.01); *G01N 2291/101* (2013.01); *G01N 2291/2636* (2013.01)

(58) Field of Classification Search
CPC .. G01N 29/221; G01N 29/2462; G01N 29/28; G01N 2291/2636; G01N 2291/0232; G01N 2291/0235; G01N 29/24; G01N 2291/0231; G01N 2291/2694; G01N 29/04; G01N 2291/0425; G01N 29/0645
See application file for complete search history.

(56) References Cited

U.S. PATENT DOCUMENTS

| | | |
|---|---|---|
| 2007/0057844 A1 | 3/2007 | Kollgaard |
| 2013/0220018 A1* | 8/2013 | Kollgaard ............. G01N 29/04 73/618 |
| 2014/0000370 A1 | 1/2014 | Bond-Thorley et al. |
| 2015/0355146 A1 | 12/2015 | Uematsu et al. |

FOREIGN PATENT DOCUMENTS

| | | |
|---|---|---|
| JP | S63126859 U | 8/1988 |
| JP | H01142858 U | 9/1989 |
| JP | 2014149241 A | 8/2014 |
| WO | 8604416 A1 | 7/1986 |

* cited by examiner

SUPERSONIC INSPECTION JIG AND SUPERSONIC INSPECTION METHOD

RELATED APPLICATIONS

The present application is a National Phase of International Application Number PCT/JP2017/014796 filed Apr. 11, 2017 and claims priority from Japanese Application Number 2016-081170 filed Apr. 14, 2016.

TECHNICAL FIELD

The present invention relates to a supersonic inspection jig and a supersonic inspection method, and especially, to an inspection jig of an area around a hole used in a supersonic inspection and a supersonic inspection method of the area around the hole.

BACKGROUND ART

It is supposed that an inspection target having a hole is inspected by using a supersonic probe. A supersonic wave detection signal detected by a probe when the position of a supersonic wave emitting surface of the probe and the position of the hole overlap, and the supersonic wave detection signal detected by the probe when the position of the supersonic wave emitting surface of the probe and the position of the hole do not overlap are different mainly each other. Therefore, the detection signal is not stable when the state that the position of the probe and the position of the hole do not overlap and the state that the position of the probe and the position of the hole overlap switch frequently. Of course, if the probe is operated so as not to approach the hole, the detection signal is stabilized. However, in this case, there is a fear that the inspection of the area around the hole becomes insufficient.

As above, when the inspection target with the hole is inspected by using the supersonic probe, a high level of skill is required to a worker.

As the related technique, Patent Literature 1 (JP 2014-149241A) discloses an ultrasonic flaw detection jig for inspecting an inspection target hole. However, even when the ultrasonic flaw detection jig according to Patent Literature 1 is used, a state changes between the state that the position of the probe and the position of the hole overlap and the state that the position of the probe and the position of the hole do not overlap.

CITATION LIST

[Patent Literature 1] JP 2014-149241A

SUMMARY OF THE INVENTION

An object of the present invention is to provide a supersonic inspection jig and a supersonic inspection method to make an inspection of an area around a hole executable easily.

The above object and other objects of this invention and profits except for them can be easily confirmed by the following description and the attached drawings.

A supersonic inspection jig in some embodiments has: an insertion section that is inserted into a hole of an inspection target; and a flange section connected with the insertion section and contacting the inspection target. The flange section has a flange section first surface that is a surface on a side contacting the inspection target; and a flange section second surface that is a surface on a side contacting a probe. A position limiting section is provided on the flange section second surface to limit a position of the probe such that the probe is maintained in a position separate from a central axis of the hole.

In the above supersonic inspection jig, the position limiting section may have a first annular wall surface to guide a movement of the probe.

In the above supersonic inspection jig, the first annular wall surface is configured to prevent the probe from moving to a direction separate from the center axis, or prevent the probe from moving to a direction approaching the center axis.

In the above the supersonic inspection jig, a distance between the center axis and the first annular wall surface may be smaller than a distance between the center axis and an outer circumferential surface of the insertion section.

In the above supersonic inspection jig, the position limiting section may have a first annular concave section defined by a plurality of wall surfaces containing the first annular wall surface. Also, the position limiting section may have a second position limiting section that is different from the first annular concave section.

In the above the supersonic inspection jig, the flange section may have a supply passage configured to supply a coupling material between the flange section and the inspection target.

In the above supersonic inspection jig, the flange section may have an inner circumference section arranged to contact the inspection target; and an outer circumference section arranged outside than the inner circumference section and arranged to be separate from the inspection target.

The above supersonic inspection jig may further include a first attachment member arranged outside the insertion section, to adjust a size of an outer diameter of a part inserted into the hole.

The above the supersonic inspection jig may further include a second attachment member arranged on the flange section first surface, to adjust an area where the probe is guided.

In the above the supersonic inspection jig, the position limiting section may have a first mechanism to maintain a relative position of the probe to the flange section in a first position. The flange section may be configured to rotate around the center axis together with the probe.

In the above the supersonic inspection jig, the position limiting section may have a second mechanism to maintain a relative position of the probe to the flange section in a second position.

An orbit of the probe positioned by the first mechanism and an orbit of the probe positioned by the second mechanism partially overlap each other and do not overlap in other parts.

A supersonic inspection method in some embodiments includes: inserting an insertion section of a supersonic inspection jig into a hole of a inspection target; arranging a flange section of the supersonic inspection jig such that a first surface of the flange section contacts the inspection target; arranging a probe on a second surface of the flange section; and inspecting an area of the inspection target around the hole by using the probe. The inspecting includes: maintaining the probe in a position separate from a central axis of the hole by the position limiting section provided on the second surface.

In the above supersonic inspection method, the position limiting section has a first annular wall surface to guide a movement of the probe. The inspecting includes: moving the probe to turn around the center axis along the first annular wall surface.

In the above supersonic inspection method, the inspecting includes: moving the probe to turn around the center axis together with the flange section.

In the supersonic inspection method, the inspecting includes: maintaining a width corresponding to an overlap area between the hole and a supersonic wave emitting surface of the probe in a range of 0.1 mm to 2 mm.

According to the present invention, there can provide the supersonic inspection jig and the supersonic inspection method to make an inspection of an area around the hole executable easily.

DESCRIPTION OF THE EMBODIMENTS

Hereinafter, a supersonic inspection jig and a supersonic inspection method according to an embodiment will be described with reference to the attached drawings. An identical reference numeral is assigned to a component having an identical function in the attached drawings. The repetitive description of the component assigned with the identical reference numeral is omitted.

(Superonic Inspection Jig in Embodiment)

Figure 1:
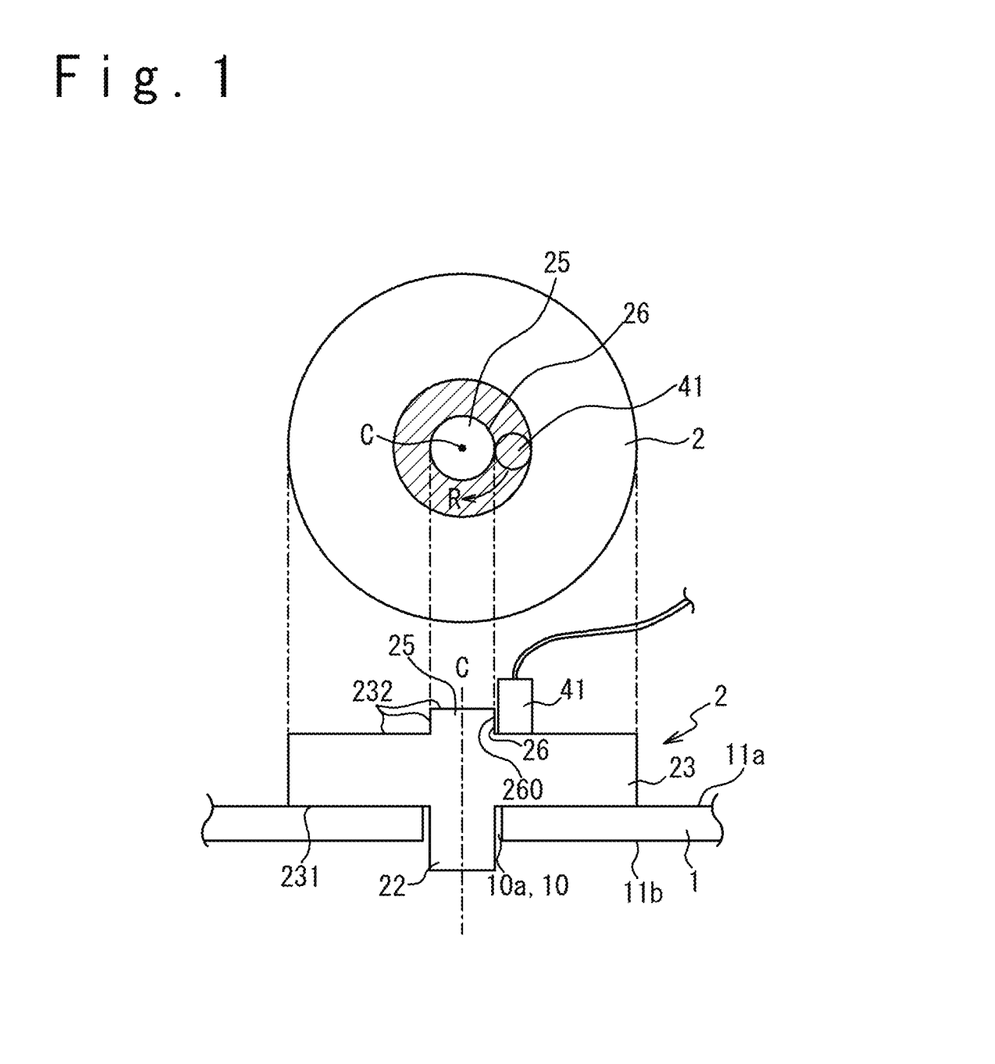
FIG. 1 is a diagram showing an example of a supersonic inspection jig in an embodiment, and shows a plan view of the supersonic inspection jig on an upper side and a side view thereof on a lower side.

Referring to FIG. 1, a supersonic inspection jig 2 in the embodiment will be described. The upper part of FIG. 1 shows a plan view and the lower part thereof shows a side cross sectional view.

The supersonic inspection jig 2 is a jig used to inspect the periphery of a hole of an inspection target 1, i.e. an area around a hole 10. For example, the area around the hole 10 is an area in which the distance from the edge of the hole 10 is in a range of 0 mm to 100 mm. For example, the inspection target 1 is a board made from glass fiber reinforced plastic (FRP) having the hole 10. For example, the hole 10 is a hole in which a fastener for fastening is inserted. In an example shown in FIG. 1, the cross section shape of the hole (a shape in a plane perpendicular to a central axis C of the hole) is truly circular. However, the cross section shape of the hole may be a shape different from truly circular, e.g. an oval or an ellipse. Also, in the example shown in FIG. 1, the shape of the cross section perpendicular to the central axis C of the hole 10 does not change along the central axis C. However, the shape of the cross section perpendicular to the central axis C of the hole 10 may change along the central axis C. For example, the hole 10 may be a hole with a countersink.

The supersonic inspection jig 2 is configured of a material that can transmit or communicate an inspection supersonic wave. For example, the material of the supersonic inspection jig 2 contains resins such as acrylic resin, epoxy resin, and polyester resin. Note that the propagation speed of the supersonic wave in the supersonic inspection jig 2 is slower than in air. That is, the supersonic inspection jig 2 functions as a delay material to reduce the propagation speed of the supersonic wave. The supersonic wave immediately after being emitted from the supersonic emission plane is sometimes unstable, but the existence of the delay material stabilizes the supersonic wave.

The supersonic inspection jig 2 has an insertion section 22 that protrudes to be inserted into the hole 10. The central axis of the insertion section 22 and the central axis C of the hole 10 coincide with each other. The outer circumference surface of the insertion section 22 has a shape complementary to the wall surface defining the hole 10. That is, a gap between the outer circumference surface of the insertion section 22 and the wall surface defining the hole is set to a value which is as small as possible. When the hole 10 is a straight hole having a circular columnar shape, the insertion section 22 has the circular columnar shape. The circular columnar shape contains a pseudo circular columnar shape. In the example shown in FIG. 1, the bottom of the insertion section 22 protrudes downwardly from the undersurface 11b of inspection target 1. Alternatively, the bottom of insertion section 22 may be situated on an upward position from the undersurface 11b of inspection target 1.

The supersonic inspection jig 2 has a flange section 23 that contacts the inspection target 1. The flange section 23 and the insertion section 22 are connected to each other. In the example shown in FIG. 1, the flange section 23 and the insertion section 22 are formed as a unit body. However, the flange section 23 and the insertion section 22 may be separate bodies. In this case, the insertion section 22 may be detachable from the flange section 23. When the insertion section 22 is detachable from the flange section 23, the insertion section 22 of an appropriate size is installed to the flange section 23 according to the size of the hole 10.

The flange section 23 has a first surface 231 and a second surface 232. The first surface 231 is a surface that contacts the surface of the inspection target 1 (for example, an upper surface 11a of the inspection target). The second surface 232 is a surface that contacts the probe 41.

A position limiting section 26 is provided on the second surface 232. The position limiting section 26 limits the position of the probe 41 so that the position of the probe 41 is maintained in a position separate from the central axis C of the hole 10. In the example shown in FIG. 1, the position limiting section 26 is a side surface of the first protruding section 25. The first protruding section 25 protrudes from the surface of the flange section 23 to a direction opposite to the protruding direction of the insertion section 22. In the example shown in FIG. 1, the position limiting section 26 prevents the probe 41 from moving to the direction approaching the central axis C. It is restrained by the position limiting section 26 that the probe 41 and the hole 10 overlap when viewed in the direction along the central axis C. Especially, there is no case that the probe 41 and the central axis C of the hole 10 overlap, when viewed in the direction along the central axis C. As a result, it is restrained that a signal detected by the probe 41 is destabilized. Also, a quantity of noise in the detected signal is reduced. Also, as a result with a reduced quantity of noise, the generation of an error when detecting a flaw in the inspection target is reduced. Also, by the position limiting section 26, a variation of the inspection result depending on an operator can be restrained. Also, the exceedingly careful operation to avoid approaching the hole becomes unnecessary by the position limiting section 26. As a result, the increase in the efficiency of inspection and the reduction of inspection time can be realized.

In the example shown in FIG. 1, the position limiting section 26 is an annular wall surface to guide a movement of the probe 41 and, that is, a first annular wall surface 260. The first annular wall surface 260 is a wall surface which the side surface of the probe 41 contacts. The operator can stably inspect the area around the hole 10 only by moving the probe 41 along the first annular wall surface 260. In the example shown in FIG. 1, it becomes possible to stably inspect an annular area around the hole 10 (an area shown by the slanted lines in FIG. 1). In the example shown in FIG. 1, the radius of the first annular wall surface 260 is slightly smaller than the radius of the hole 10 (for example, by an optional value in a range of 0 mm to 2 mm). However, the radius of the first annular wall surface 260 may be equal to the radius of the hole 10. Note that in this Specification, the "annular" shape is not limited to the "circle". For example, when the cross section shape of the hole 10 is oval, the first annular wall surface 260 is a wall surface of an oval shape.

In the example shown in FIG. 1, the position limiting section 26 is configured from the side surface of the first protruding section 25. However, the specific structure or shape of the position limiting section 26 is not limited to the example shown in FIG. 1. In this Specification, various modification examples of the position limiting section 26 will be described.

First Modification Example

Figure 2A:
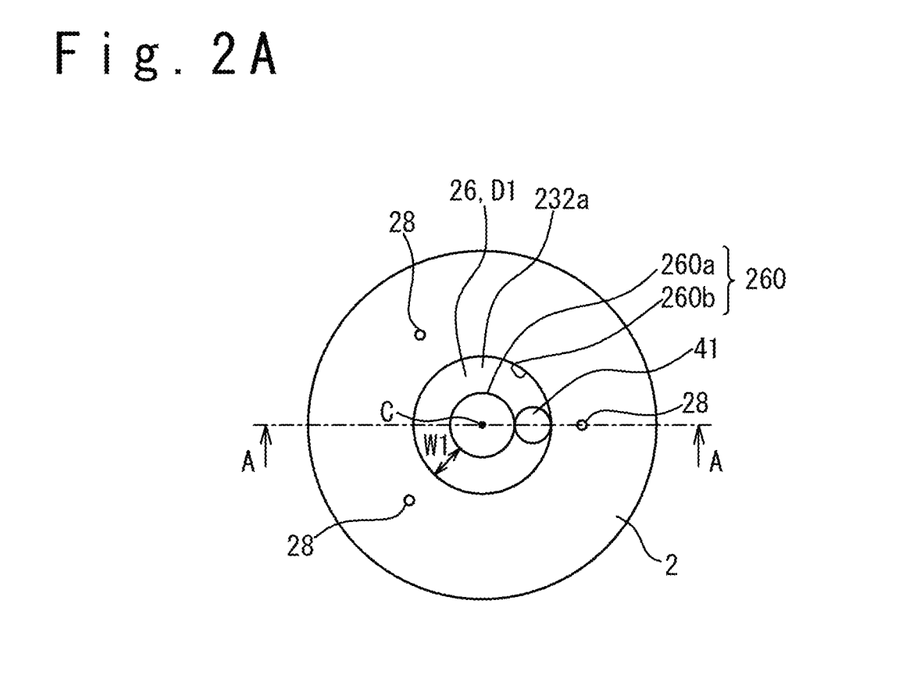
FIG. 2A is a schematic plan view showing the supersonic inspection jig in a first modification example.
Figure 2B:
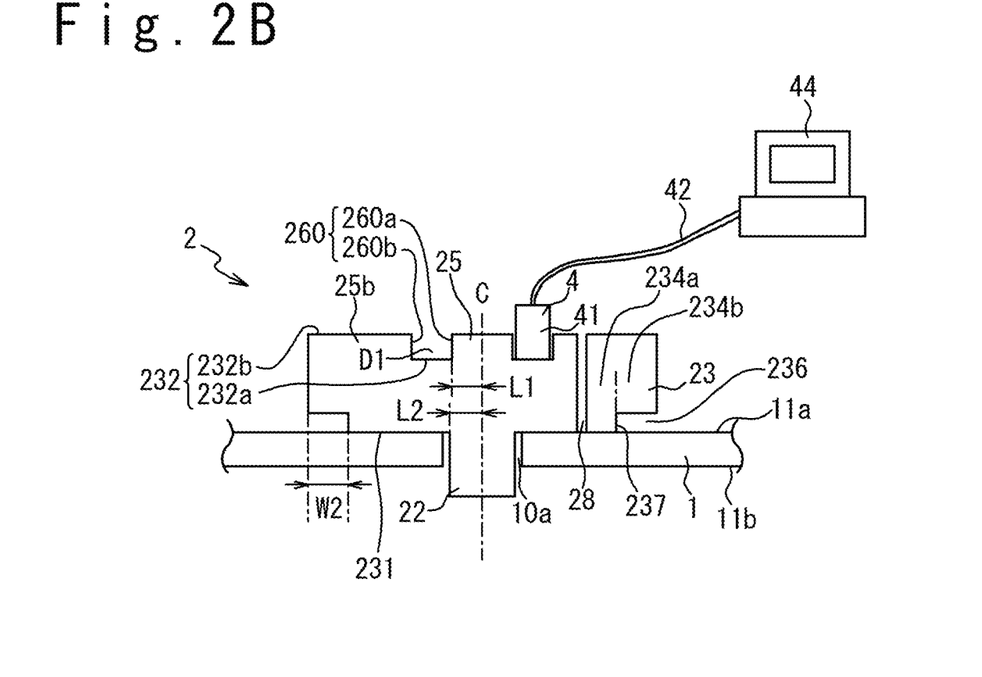
FIG. 2B is a cross sectional view of the supersonic inspection jig along the A-A line in FIG. 2A.

Referring to FIG. 2A and FIG. 2B, the supersonic inspection jig 2 in a first modification example will be described. FIG. 2A is a schematic plan view showing the supersonic inspection jig in the first modification example. Also, FIG. 2B is a cross sectional view of of the supersonic inspection jig along the A-A line in FIG. 2A.

(First Annular Concave Section D1)

In the supersonic inspection jig 2 in the first modification example, the position limiting section 26 is a first annular concave section D1. The first annular concave section D1 is a concave section that is defined by a first annular wall surface 260a, a concave section bottom surface 232a and a second annular wall surface 260b.

The first annular concave section D1 defines an annular orbit on which the probe 41 is movable. The first annular wall surface 260a is an outer circumference surface of the first protruding section 25, and prevents the probe 41 from moving to the direction approaching the central axis C of the hole 10a.

The concave section bottom surface 232a is a surface which the supersonic wave emitting surface of the probe 41 contacts. On the other hand, an upper surface of the first protruding section 25 and an upper surface 232b of the second protruding section 25b of the second surface 232 of the supersonic inspection jig 2 are surfaces which the supersonic wave emitting surface of the probe 41 does not contact.

The second annular wall surface 260b is an inner circumference surface of the second protruding section 25b, and prevents the probe 41 from moving to a direction leaving from the central axis C. The second protruding section 25b is a part protruding from the flange section 23 to the direction opposite to the protruding direction of the insertion section 22, and is the part situated outside than the first protruding section 25.

In the first modification example, the supersonic inspection jig 2 has the first annular concave section D1. Therefore, the movement orbit of the probe 41 is stable. Thus, in the first modification example, it is possible to inspect the area around the hole 10a more stably. When the width W1 of the first annular concave section D1, i.e. a distance between the first annular wall surface 260a and the second annular wall surface 260b is larger than the diameter of the probe 41, one of the first annular wall surface 260a and the second annular wall surface 260b can be used as a guide surface to guide the probe 41. Alternatively, a first inspection may be carried out by using the first annular wall surface 260a as the guide surface, and then a second inspection may be carried out by using the second annular wall surface 260b as the guide surface. In this case, because the inspection is carried out twice, the reliability of the inspection improves. In an example shown in FIG. 2B, although the radius of the first annular wall surface 260a is slightly smaller than the radius of the hole 10a (for example, by an optional value in a range of 0 mm to 2 mm), the radius of the first annular wall surface 260a may be equal to the radius of the hole 10a.

As shown in FIG. 2B, the distance L1 between the central axis C of the hole 10a and the first annular wall surface 260a may be smaller than the distance L2 between the central axis C of the hole 10a and the outer circumference surface of the insertion section 22. In this case, the supersonic wave emitting surface of the probe 41 guided with the first annular wall surface 260a and the hole 10a overlap slightly when viewed in the direction along the central axis C. As a result, the area around the hole 10 is wholly inspected, including an area in contact with the hole 10. For example, the difference between the distance L2 and the distance L1 is in a range of 0.1 mm to 2 mm.

(Supply of Coupling Material)

In the first modification example, the supersonic inspection jig 2 has a supply passage 28 that supplies a liquid coupling material. For example, the liquid coupling material is water. When air intervenes between the supersonic wave emitting surface of the probe 41 and the inspection target 1, the transmission of the supersonic wave to the inspection target 1 is obstructed. Therefore, it is desirable that the air existing between the supersonic wave emitting surface of the probe 41 and the inspection target 1 is substituted with the liquid coupling material. In the example shown in FIG. 2A and FIG. 2B, the coupling material is supplied between the flange section 23 and the inspection target 1 by using the supply passage 28. In the example shown in FIG. 2A, a plurality of the supply passages 28 are arranged at equal intervals around the central axis C. In the example shown in FIG. 2A and FIG. 2B, it becomes possible to continuously supply the coupling material by the supply passages 28.

There is a case where air bubbles are mixed in the coupling material to be supplied through the supply passages 28. When the air bubble intervenes between the flange section 23 and the inspection target 1, there is a fear that the transmission of the supersonic wave to the inspection target 1 is obstructed. Therefore, in the example shown in FIG. 2B, by reducing a contact area between the flange section 23 and the inspection target 1, the air bubbles which exist between the flange section 23 and the inspection target 1 can be easily removed. That is, because the distance from an output port of the supply passage 28 to the space 236 is short, the air bubbles can be easily removed. Also, by reducing the contact area between the flange section 23 and the inspection target 1, the pressure that acts to the inspection target 1 from the flange section 23 becomes large. As a result, the air bubbles between the flange section 23 and the inspection target 1 can be easily removed.

In the example shown in FIG. 2B, to reduce the contact area between the flange section 23 and the inspection target 1, a part of the first surface 231 is provided at a position receded more than the other part of the first surface 231. In the example shown in FIG. 2B, a part corresponding to the receded position is an outer circumference section 234b, and a part corresponding to a position in contact with the inspection target 1 is an inner circumference section 234a. In other words, the flange section 23 has the inner circumference section 234a arranged to contact the inspection target 1, and the outer circumference section 234b arranged outside than the inner circumference section 234a and arranged to be separate from the inspection target 1. As a result, the space 236 is formed between the outer circumference section 234b and the inspection target 1. In the example shown in FIG. 2B, a step between the inner circumference section 234a and the outer circumference section 234b contains the surface 237 parallel to the central axis C. However, the step may contain a slope. That is, the step may contain the slope in which the distance from the inspection targets 1 becomes large as leaving the central axis C. In the example shown in FIG. 2B, the width W2 of the outer circumference section 234b is in a range of 5 mm to 50 mm.

The configuration of supply passage 28 and/or the configuration to reduce the contact area between the flange section 23 and the inspection target 1 are possible to apply to the above-mentioned embodiments or the following modification examples.

(Supersonic Probing Device)

In the example shown in FIG. 2B, the supersonic probing device 4 has the probe 41, a computer system with a display 44, and a detection signal transmission line 42. The detection signal transmission line 42 transmits the detection signal detected by the probe 41 to the computer system. The display 44 displays the detection result by the probe 41. The probe 41 may transmit the detection signal to the computer system with radio. In this case, the detection signal transmission line 42 can be omitted. In case of no detection signal transmission line 42, there is not a risk that the detection signal transmission line 42 is entwined when the probe 41 is turned around the central axis C.

Second Modification Example

Figure 3:
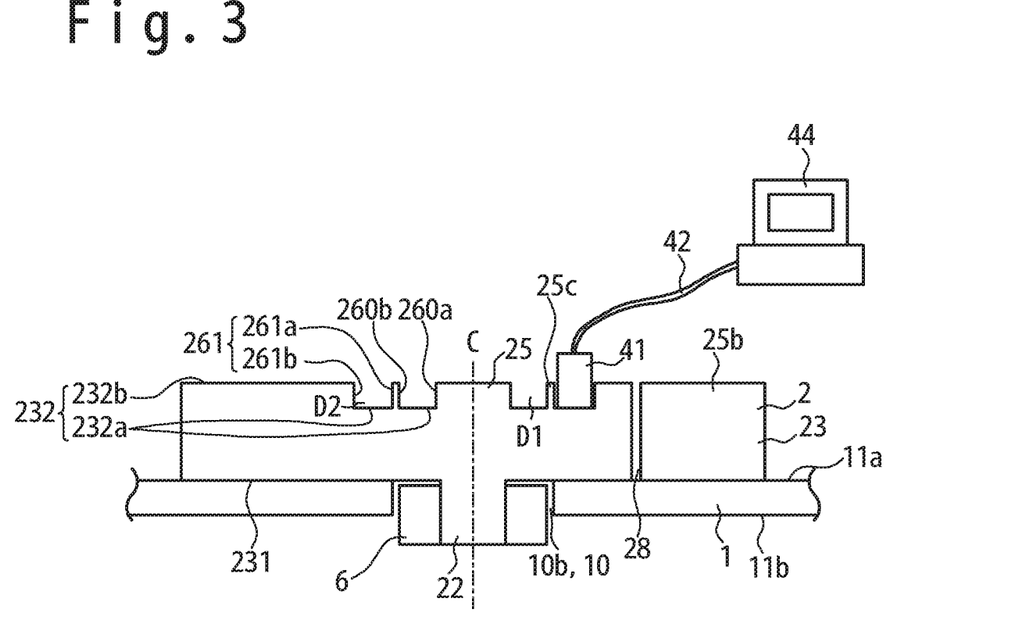
FIG. 3 is a schematic cross sectional view showing the supersonic inspection jig in a second modification example.

Referring to FIG. 3, the supersonic inspection jig 2 according to a second modification example will be described. FIG. 3 is a schematic cross sectional view showing the supersonic inspection jig 2 in the second modification example.

(Second Position Limiting Section)

The supersonic inspection jig 2 in the second modification example has a second position limiting section 261 which is different from the first annular concave section D1.

The second position limiting section 261 is a position limiting section different from the first annular concave section D1 as the first position limiting section. The movement orbit of the probe 41 guided by using the second position limiting section 261 is different from that of the probe 41 guided by using the first annular concave section D1. In the example shown in FIG. 3, the second position limiting section 261 is on the outer circumference side than the first annular concave section D1. Therefore, when the area around the relatively small hole 10a is inspected, the probe 41 is guided by using the first annular concave section D1. Also, when the area around the relatively large hole 10b is inspected, the probe 41 is guided by using the second position limiting section 261. Alternatively, the second position limiting section 261 may be on the inner circumference side than the first annular concave section D1.

In the example shown in FIG. 3, the second position limiting section 261 contains a second annular concave section D2. The second annular concave section D2 and the first annular concave section D1 are adjacent to each other through a third annular protruding section 25c. The second annular concave section D2 is a concave section defined by a third annular wall surface 261a, a concave section bottom surface 232a and a fourth annular wall surface 261b. The third annular wall surface 261a and/or the fourth annular wall surface 261b function as the second position limiting section 261.

(First Attachment Member)

The supersonic inspection jig 2 in the second modification example is arranged outside the insertion section 22 (on the outer circumference side), and has a first attachment member 6 to adjust the size of outer diameter of a part to be inserted in the hole 10b. The first attachment member 6 is configured to be detachable for the insertion section 22. When the area around the relatively small hole 10a is inspected, the first attachment member 6 is not used. In this case, the outer circumference surface of the insertion section 22 faces directly to the hole 10a. On the other hand, when the area around the relatively large hole 10b is inspected, the first attachment member 6 is used. In this case, the outer circumference surface of the first attachment member 6 faces directly to the hole 10b. The outer circumference surface of the first attachment member 6 has a complementary shape to the wall surface defining the hole 10b. In the example shown in FIG. 3, the shape of the outer circumference surface of the first attachment member 6 contains a shape coincident with the outer circumference surface of a virtual circular column. In the example shown in FIG. 3, the first attachment member 6 is a member of a ring shape.

When the area around a hole larger than the hole 10b is inspected, the first attachment member 6 is arranged outside the insertion section 22, and moreover, another attachment member may be arranged outside the first attachment member 6. Also, in addition to the first position limiting section and the second position limiting section, another position limiting section may be provided.

The supersonic inspection jig 2 in the second modification example is possible to use to inspect areas around holes with various sizes.

Third Modification Example

Figure 4:
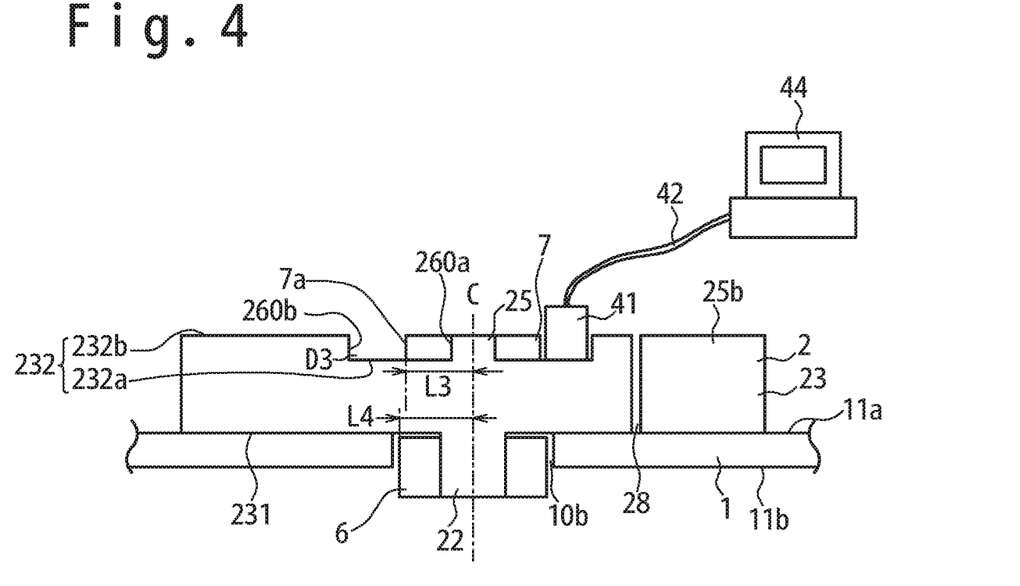
FIG. 4 is a schematic cross sectional view showing the supersonic inspection jig in a third modification example.

Referring to FIG. 4, the supersonic inspection jig 2 in a third modification example will be described. FIG. 4 is a schematic cross sectional view showing the supersonic inspection jig in the third modification example.

(Second Attachment Member)

The supersonic inspection jig 2 in the third modification example has a second attachment member 7 arranged on the second surface 232. The second attachment member 7 adjusts an area where the probe 41 is guided.

In the example shown in FIG. 4, the second attachment member 7 is arranged in the first annular concave section D3. In an example shown in FIG. 4, the width of the first annular concave section D3 is larger than the width of the first annular concave section D1 in the example shown in FIG. 2A.

The second attachment member 7 has an inner circumference surface arranged to contact the first annular wall surface 260a of the first protruding section 25. The outer circumference surface 7a of the second attachment member 7 (the annular wall surface) functions as the position limiting section. When the area around the relatively small hole 10a is inspected, the second attachment member 7 is not used. In this case, the first annular wall surface 260a functions as the position limiting section, and the probe 41 is guided along the first annular wall surface 260a. On the other hand, when the area around the relatively large hole 10b is inspected, the second attachment member 7 is used. In this case, the outer circumference surface 7a of the second attachment member 7 functions as the position limiting section, and the probe 41 is guided along the outer circumference surface 7a.

In the example shown in FIG. 4, the first attachment member 6 and the second attachment member 7 are used. The distance L3 between the central axis C and the outer circumference surface 7a (that is, the radius of the second attachment member 7) may be smaller than the distance L4 between the central axis C and the outer circumference surface of the first attachment member 6 (that is, the radius of the first attachment member 6). In this case, when the probe 41 is guided along the outer circumference surface 7a, the supersonic wave emitting surface of the probe 41 and the hole 10b overlap slightly when viewed in the direction along the central axis C. As a result, the area around the hole 10b is wholly inspected, including an area contacting the hole 10b. For example, the difference between the distance L4 and the distance L3 is in a range of 0.1 mm to 2 mm.

Figure 5:
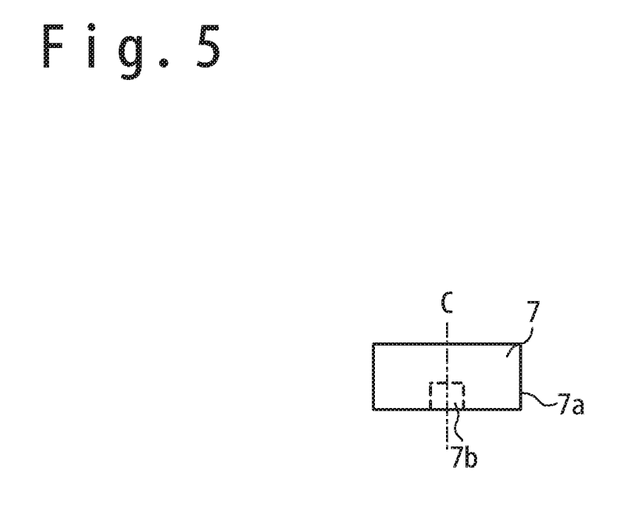
FIG. 5 is a schematic side view showing an example of a second attachment member.

In the example shown in FIG. 4, the shape of the outer circumference surface 7a of the second attachment member 7 contains the shape coincident with the outer circumference surface of a virtual circular column. In the example shown in FIG. 4, the second attachment member 7 is a member of a ring shape. Alternatively, as shown in FIG. 5, the second attachment member 7 may be a member with a concave section 7b having a complementary shape to the shape of the first protruding section 25.

When the neighborhood of a hole larger than the hole 10b is inspected, the second attachment member 7 is arranged outside the first protruding section 25, and moreover, another attachment member is arranged outside the second attachment member 7.

The supersonic inspection jig 2 in the third modification example is possible to use to inspect areas around holes with various sizes.

Fourth Modification Example

Figure 6:
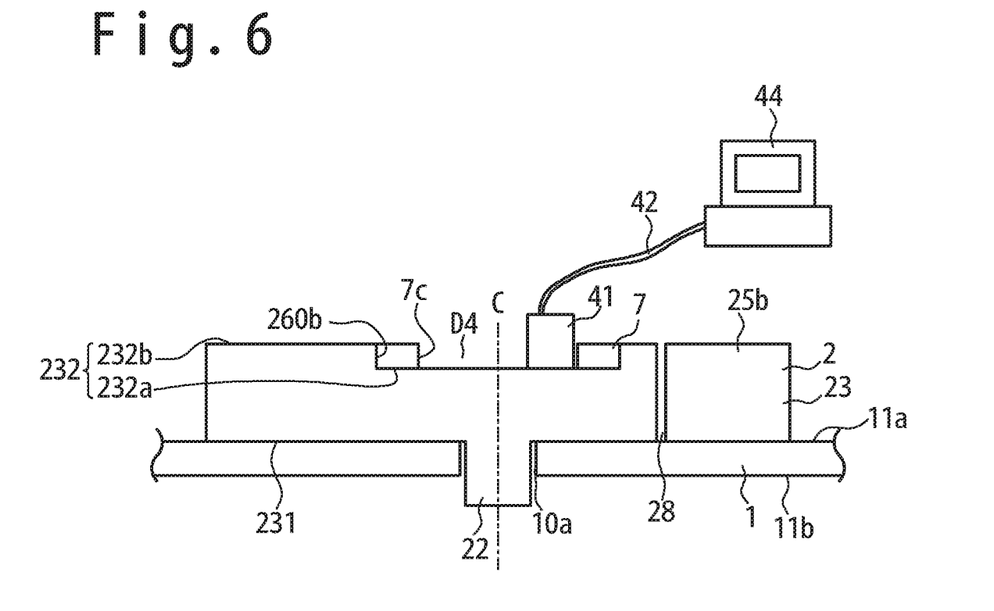
FIG. 6 is a schematic cross sectional view showing the supersonic inspection jig in a fourth modification example.

Referring to FIG. 6, the supersonic inspection jig 2 in a fourth modification example will be described. FIG. 6 is a schematic cross sectional view showing the supersonic inspection jig in the fourth modification example.

(Second Attachment Member)

The supersonic inspection jig 2 in the fourth modification example has the second attachment member 7 arranged on the second surface 232. The second attachment member 7 adjusts an area where the probe 41 is guided.

In the example shown in FIG. 6, the second attachment member 7 is arranged in a concave section D4 having a complementary shape to a virtual circular board. Alternatively, the second attachment member 7 may be arranged in the first annular concave section D3 as shown in FIG. 4.

The second attachment member 7 has the outer circumference surface arranged to contact the second annular wall surface 260b of the second protruding section 25b. An inner circumference surface 7c of the second attachment member 7 (the annular wall surface) functions as the position limiting section. When the area around the relatively small hole 10a is inspected, the second attachment member 7 is used. In this case, the inner circumference surface 7c functions as the position limiting section, and the probe 41 is guided along the inner circumference surface 7c. On the other hand, when the area around the relatively large hole 10b is inspected, the second attachment member 7 is not used. In this case, the second annular wall surface 260b functions as the position limiting section, and the probe 41 is guided along the second annular wall surface 260b.

In the example shown in FIG. 6, when the area around the relatively large hole 10b is inspected, the first attachment member 6 may be arranged outside the insertion section 22.

In the example shown in FIG. 6, the shape of the inner circumference surface 7c of the second attachment member 7 contains a shape coincident with the outer circumference surface of a virtual circular column. In the example shown in FIG. 6, the second attachment member 7 is a member of a ring shape.

When the area around a hole smaller than the hole 10a is inspected, the second attachment member 7 is arranged inside the second protruding section 25b, and moreover, another attachment member may be arranged inside the second attachment member 7.

The supersonic inspection jig 2 in the fourth modification example is possible to use to inspect areas around holes with various sizes.

Fifth Modification Example

Figure 7A:
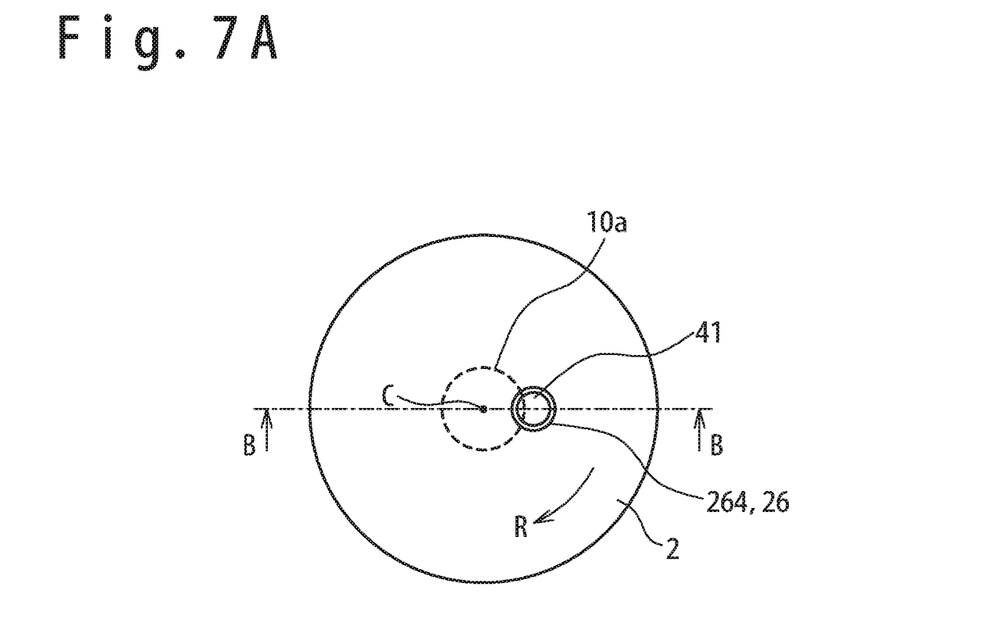
FIG. 7A is a schematic plan view showing the supersonic inspection jig in a fifth modification example.
Figure 7B:
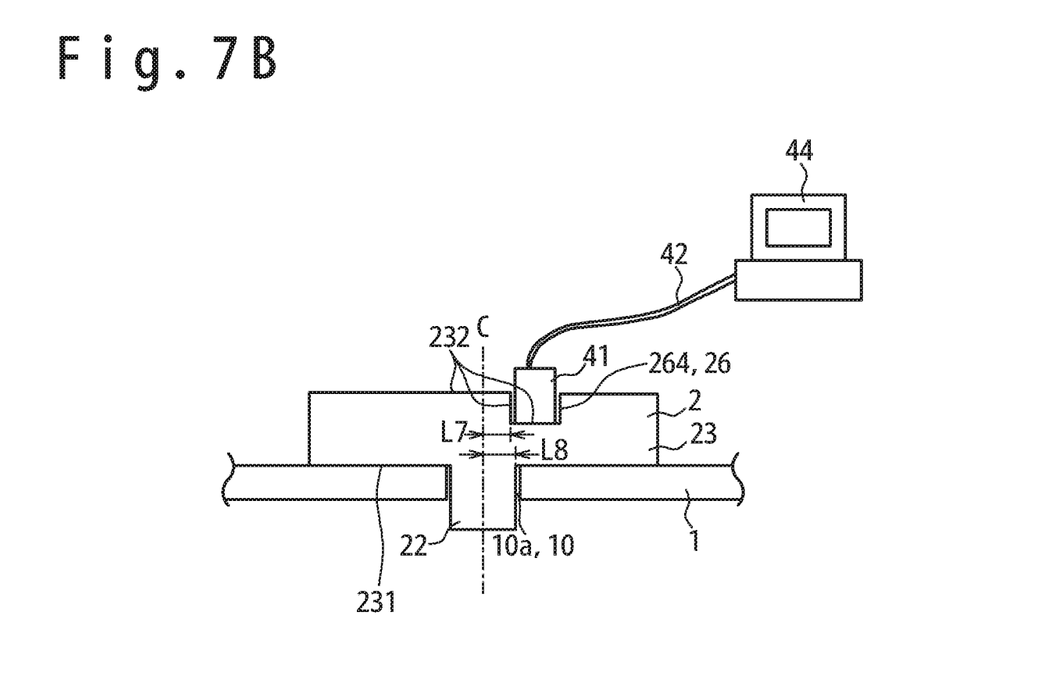
FIG. 7B is a schematic cross sectional view showing the supersonic inspection jig along the B-B line in FIG. 7A.

Referring to FIG. 7A and FIG. 7B, the supersonic inspection jig 2 in the fifth modification example will be described. FIG. 7A is a schematic plan view showing the supersonic inspection jig 2 in the fifth modification example. Also, FIG. 7B is a cross sectional view along the B-B line in FIG. 7A.

In the example shown in FIG. 7A and FIG. 7B, the flange section 23 rotates around the central axis C together with the probe 41.

In the example shown in FIG. 7A and FIG. 7B, the flange section 23 has a first mechanism 264 to maintain a relative position of the probe 41 to the flange section 23 as a first position. In this modification example, the first mechanism 264 functions as the position limiting section 26. In the example shown in FIG. 7A and FIG. 7B, the first mechanism 264 is the concave section to receive the probe 41. More specifically, the first mechanism 264 is the inner circumference surface configuring the concave section to receive the probe 41. Alternatively, the first mechanism 264 may be an optional engaging section to fix the probe 41 on the flange section 23 to be detachable.

In the example shown in FIG. 7A and FIG. 7B, the flange section 23 rotates around the central axis C with the probe 41 by rotating the probe 41 or the flange section 23 to the direction of R. The area around the hole 10a is inspected while the probe 41 turns around the central axis C. Regarding the probe 41 positioned by the first mechanism 264, the minimum distance L7 between one optional point on the supersonic wave emitting surface of the probe 41 and the central axis C (in other words, the minimum distance L7 between the inner circumference surface configuring the concave section to receive the probe 41 and the central axis C) is shorter than the distance L8 between the outer circumference surface of the insertion section 22 and the central axis C. In this case, when the probe 41 positioned by the first mechanism 264 is moved around the central axis C, the supersonic wave emitting surface of the probe 41 and the hole 10a overlap slightly when viewed in the direction along the central axis C. As a result, the area around the hole 10a is wholly inspected, including the area contacting the hole 10a. For example, the difference between the distance L8 and the distance L7 is in a range of 0.1 mm to 2 mm.

In the example shown in FIG. 7A and FIG. 7B, only by rotating the flange section 23 around the central axis C, the area around the hole 10a can be stably inspected. In the example shown in FIG. 7A and FIG. 7B, the insertion section 22 and the flange section 23 are rotated unitarily. However, when the insertion section 22 and the flange section 23 are connected rotatably, it is possible to rotate only the flange section 23 while restraining the rotation of the insertion section 22. Also, in the example shown in FIG. 7A and FIG. 7B, the first mechanism 264 as the position limiting section 26 is provided instead of the first annular wall surface 260 as the position limiting section 26. Alternatively, the first mechanism 264 may be provided in addition to the first annular wall surface 260.

Sixth Modification Example

Figure 8A:
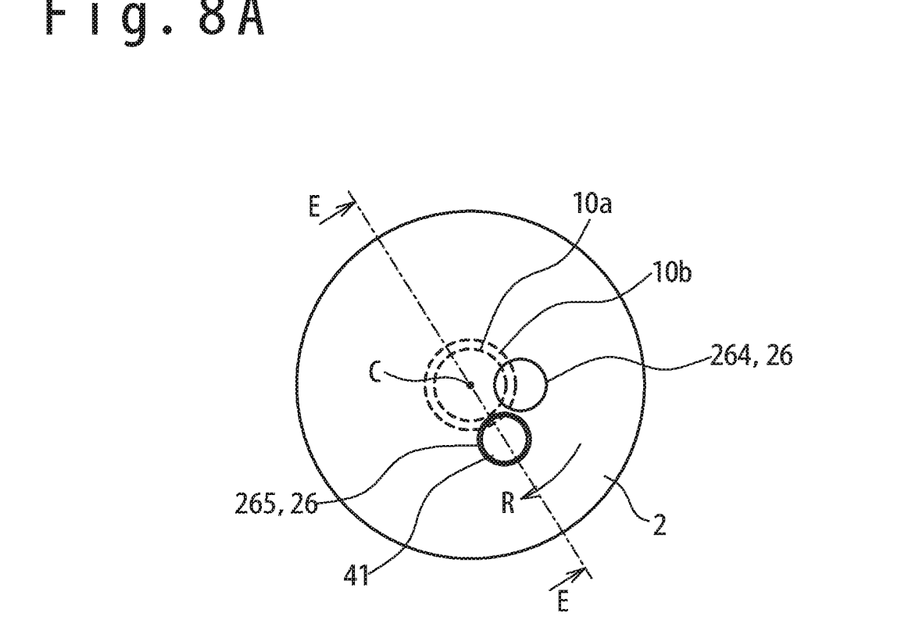
FIG. 8A is a schematic plan view showing the supersonic inspection jig in a sixth modification example.
Figure 8B:
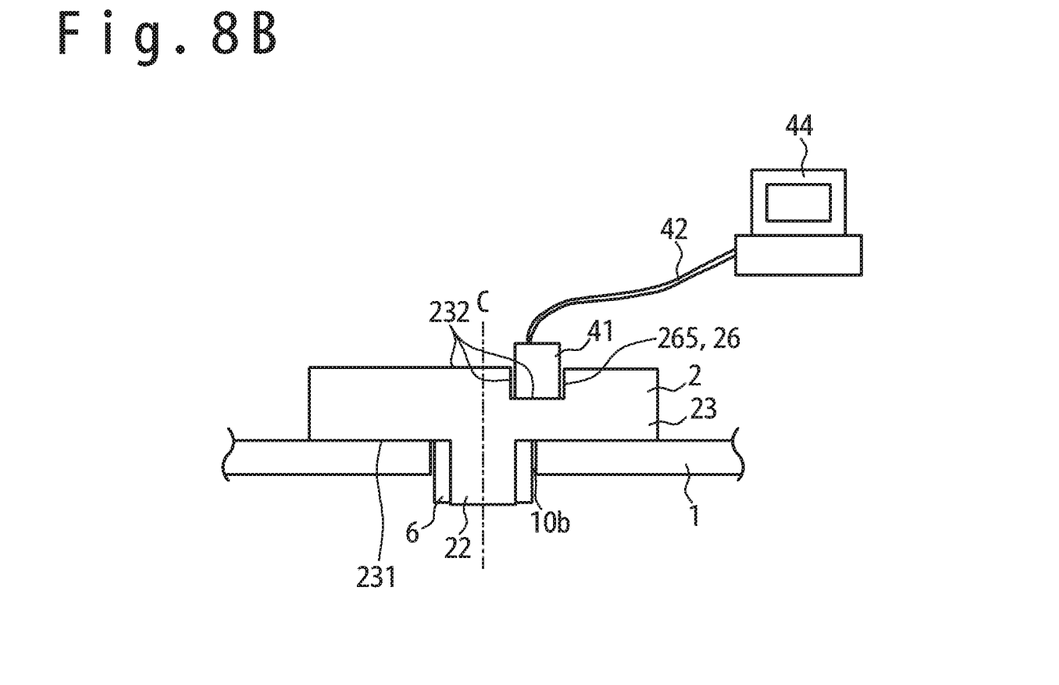
FIG. 8B is a schematic cross sectional view showing the supersonic inspection jig along the E-E line in FIG. 8A.
Figure 8C:
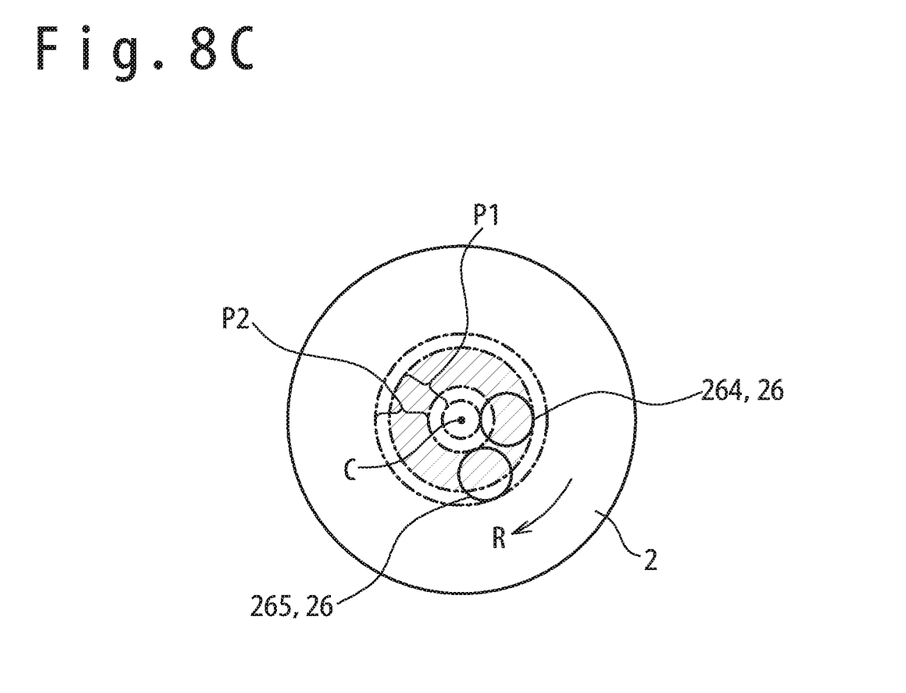
FIG. 8C is a plan view schematically showing a movement orbit of a probe.

Referring to FIG. 8A to FIG. 8C, the supersonic inspection jig 2 in a sixth modification example will be described. FIG. 8A is a schematic plan view showing the supersonic inspection jig 2 in the sixth modification example. Also, FIG. 8B is a cross sectional view of the jig 2 along the E-E line. FIG. 8C is a schematic plan view showing the movement orbit of the probe.

In the example shown in FIG. 8A and FIG. 8B, the flange section 23 has a second mechanism 265 that maintains a relative position of the probe 41 to the flange section 23 in the second position, in addition to a first mechanism 264. In the present modification example, the first mechanism 264 or the second mechanism 265 functions as the position limiting section 26. In the example shown in FIG. 8A and FIG. 8B, the second mechanism 265 is the concave section to receive the probe 41. More specifically, the second mechanism 265 is the inner circumference surface configuring the concave section to receive the probe 41. Alternatively, the second mechanism 265 may be an optional engaging section fixing the probe 41 on the flange section 23 to be detachable.

In the example shown in FIG. 8A and FIG. 8B, by rotating the probe 41 or the flange section 23 to the direction of R, the flange section 23 rotates around the central axis C together with the probe 41. Also, in the example shown in FIG. 8A and FIG. 8B, the supersonic inspection jig 2 can be used to inspect areas around the holes with various sizes. That is, when the area around the relatively small hole 10a is to be inspected, the probe 41 is positioned in the first position by the first mechanism 264. When the area around the relatively large hole 10b is to be inspected, the probe 41 is positioned in the second position by the second mechanism 265. As shown in FIG. 8B, when the area around the relatively large hole 10b is to be inspected by using the probe 41 positioned in the second position by the second mechanism 265, the first attachment member 6 is arranged outside the insertion section 22.

Referring to FIG. 8C, the orbit of the probe 41 when the flange section 23 is rotated will be described. In the example shown in FIG. 8C, the orbit P1 of the probe 41 positioned by the first mechanism 264 when the flange section 23 is rotated and the orbit P2 of the probe 41 positioned by the second mechanism 265 when the flange section 23 is rotated partially overlap each other (reference to the slanted lines part), and do not overlap in other part. In such a case, the supersonic inspection jig 2 can be used to inspect the area around the hole 10a and can also be used to inspect the area around the hole 10b which is slightly larger than the hole 10a.

(Supersonic Inspection Method)

Figure 9:
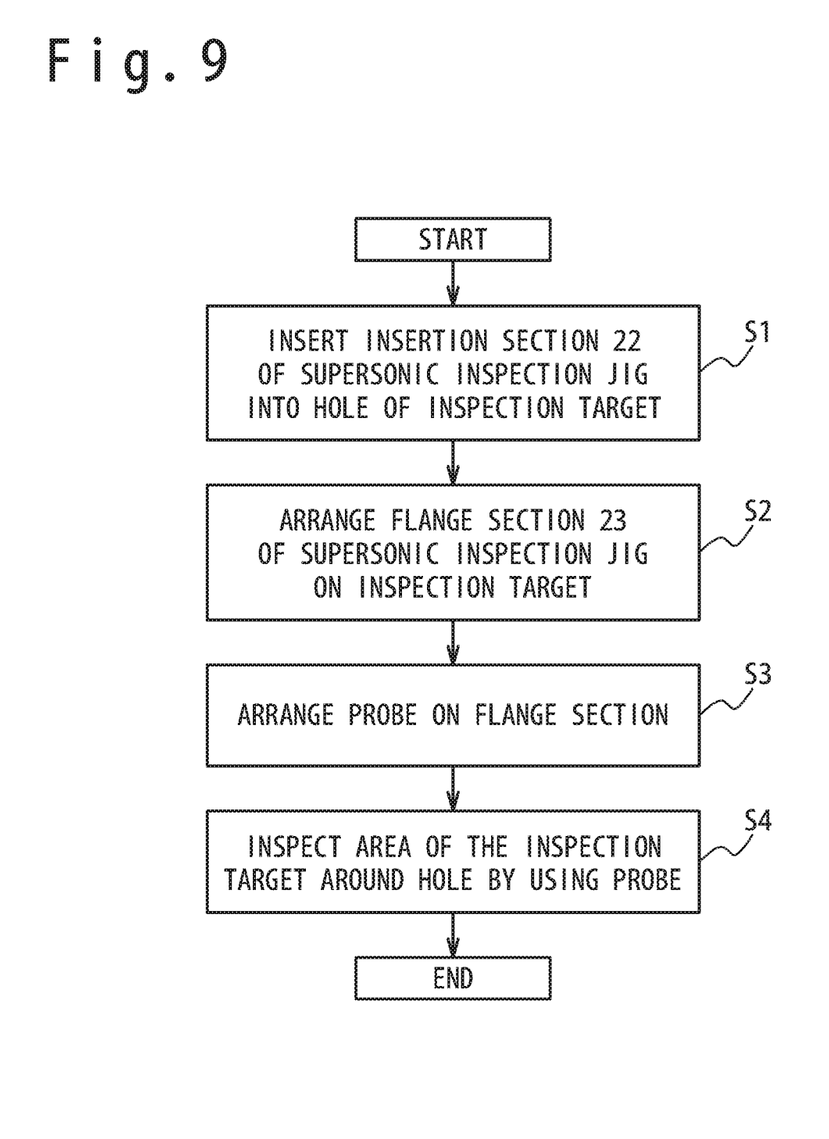
FIG. 9 is a flow chart showing an example of a supersonic inspection method.
Figure 10:
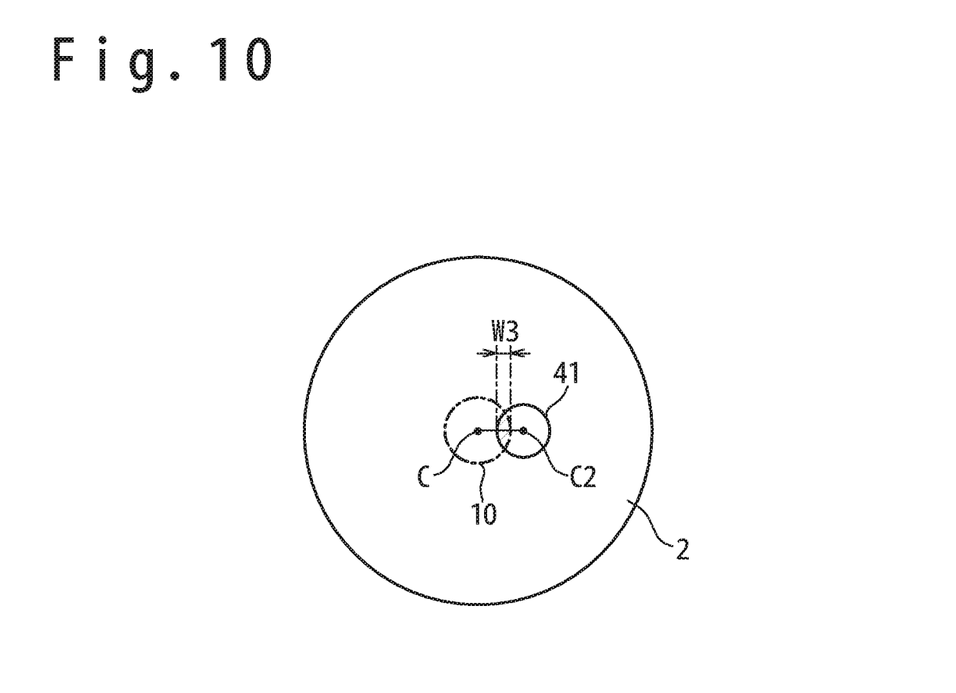
FIG. 10 is a diagram showing an overlap area and an overlap width.

Referring to FIG. 9, FIG. 10 and FIG. 1 etc., the supersonic inspection method will be described. FIG. 9 is a flow chart showing an example of supersonic inspection method. Also, FIG. 10 is a diagram showing an overlap area and an overlap width. The supersonic inspection method is carried out by using the supersonic inspection jig 2 in the above-mentioned embodiments or the supersonic inspection jig 2 in the above-mentioned modification examples.

Referring to FIG. 9 and FIG. 1 etc., at first step S1, the insertion section 22 of the supersonic inspection jig 2 is inserted in the hole 10 of the inspection target 1. Before the first step S1, the first attachment member 6 may be arranged outside the insertion section 22 of the supersonic inspection jig 2. At this time, the first attachment member 6 and the insertion section 22 may be engaged with each other so that the first attachment member 6 does not disengage from the insertion section 22.

At second step S2, the flange section 23 is arranged in such a manner that the first surface 231 of the flange section 23 of the supersonic inspection jig 2 contacts the inspection target 1. Before the second step S2, the liquid coupling material may be applied to the surface of the inspection target 1. Alternatively, after the second step S2, the coupling material may be supplied between the flange section 23 and the inspection target 1 through the supply passages 28. The supply of the coupling material to supply passage 28 may be carried out through pipes connected to the supply passages 28 or an injector.

At third step S3, the probe 41 is arranged on the second surface 232 of the flange section 23. Before the third step S3, the second attachment member 7 in either of the above-mentioned modification examples may be arranged on the second surface 232. Alternatively or additionally, the liquid coupling material may be applied between the supersonic wave emitting surface of the probe 41 and the second surface 232.

At fourth step S4, an area around the hole 10 of the inspection target 1 is inspected by using the probe 41. At the fourth step S4, the probe 41 is maintained in a position separate from the central axis C of the hole 10 by the position limiting section 26 provided for the second surface 232.

In the supersonic inspection method in the embodiment, the probe 41 moves to turn around the central axis C of the hole 10 while using the position limiting section 26. As a result, a risk can be reduced that a noise caused by the existence of the hole 10 is contained in the detection signal detected by the probe 41. As a result, a stable supersonic inspection is realized.

The position limiting section 26 provided for the second surface 232 may have the first annular wall surface 260 to guide the movement of the probe 41. In this case, at the fourth step S4, the probe 41 moves to turn around the central axis C along the first annular wall surface 260. The first annular wall surface 260 is a surface to guide the probe 41 through contact with the side surface of the probe 41.

Referring to FIG. 7A and FIG. 7B, the flange section 23 may have the first mechanism 264 to maintain a relative position of the probe 41 to the flange section 23 in the first position. The first mechanism 264 functions as the position limiting section 26. In this case, at the fourth step S4, the probe 41 moves to turn around the central axis C together with the flange section 23.

In the supersonic inspection method in the embodiment, the distance between the probe 41 and the central axis C of the hole 10 is maintained to be constant by the position limiting section 26. As a result, when the probe 41 moves to turn, the area where the supersonic wave emitting surface of the probe 41 and the hole 10 overlap does not almost change with respect to time, when viewed in a direction along the central axis C. The overlap area is the area shown by the slanted lines in FIG. 10. In the present Specification, "the overlap area" means the area where the supersonic wave emitting surface of the probe 41 and the hole 10 overlap each other, viewing the direction along the central axis C. When the cross section of the hole 10 changes along the central axis C, "the overlap area" means an overlapping area between the supersonic wave emitting surface of the probe 41 and a part of a cross section which is perpendicular to the central axis C of the hole and which has the minimum area, when viewed in the direction along the central axis C. When the probe 41 moves to turn, the width corresponding to the overlap area may be maintained in a range of 0.1 mm to 2 mm. In this Specification, "the width corresponding to the overlap area" means the length W3 of a part crossing the overlap area of a straight line which is perpendicular to the central axis C of the hole, and which links the central axis C of the hole and the longitudinal center axis C2 of the probe 41.

The present invention is not limited to the above embodiments. It would be clear that each embodiment may be changed or modified appropriately in the range of the technical thought of the present invention. Also, various techniques used in each embodiment or modification example are possible to apply to another embodiment or modification example, unless the technical contradiction occurs.

The present invention is based on Japanese Patent Application No. JP 2016-081170 as a basis application and claims a priority based on it. The disclosure of the basis application is incorporated herein by reference.

The invention claimed is:

1. A supersonic inspection jig comprising:
an insertion section that is inserted into a hole of an inspection target; and
a flange section connected with the insertion section and contacting the inspection target,
wherein the flange section comprises:
a flange section first surface that is a surface on a side contacting the inspection target; and
a flange section second surface that is a surface on a side contacting a probe,
wherein the flange section includes a protruding section having the flange section second surface,
wherein a position limiting section is provided on the flange section second surface of the protruding section to limit a position of the probe such that the probe is prevented from moving to a direction separate from a center axis of the hole and/or from moving to a direction approaching the center axis of the hole,
wherein the position limiting section has a first annular wall surface to guide a movement of the probe, and
wherein the first annular wall surface contacts the probe which is movable along the first annular wall surface.

2. The supersonic inspection jig according to claim 1, wherein the first annular wall surface is configured to prevent the probe from moving to the direction separate from the center axis, or prevent the probe from moving to the direction approaching the center axis.

3. The supersonic inspection jig according to claim 1, wherein a distance between the center axis and the first annular wall surface is smaller than a distance between the center axis and an outer circumference surface of the insertion section.

4. The supersonic inspection jig according to claim 1, wherein the position limiting section comprises a first annular concave section defined by a plurality of wall surfaces containing the first annular wall surface, and
wherein the position limiting section comprises a second position limiting section that is different from the first annular concave section.

5. The supersonic inspection jig according to claim 1, wherein the flange section comprises a supply passage configured to supply a coupling material between the flange section and the inspection target.

6. The supersonic inspection jig according to claim 5, wherein the flange section comprises:
an inner circumference section arranged to contact the inspection target; and
an outer circumference section arranged outside than the inner circumference section and arranged to be separate from the inspection target.

7. The supersonic inspection jig according to claim 1, further comprising:
a first attachment member arranged outside the insertion section, to adjust a size of an outer diameter of a part to be inserted into the hole.

8. The supersonic inspection jig according to claim 1, further comprising:
a second attachment member arranged on the flange section second surface, to adjust an area where the probe is guided.

9. A supersonic inspection method comprising:
inserting an insertion section of a supersonic inspection jig into a hole of an inspection target;
arranging a flange section of the supersonic inspection jig such that a first surface of the flange section contacts the inspection target;
arranging a probe on a second surface of the flange section, the flange section including a protruding section having the second surface; and inspecting an area of the inspection target around the hole by using the probe, wherein the inspecting comprises:
maintaining the probe in a position separate from a central axis of the hole by a position limiting section provided on the second surface of the protruding section; and
moving the probe to turn around the central axis along a first annular wall surface, wherein the position limiting section has the first annular wall surface.

10. The supersonic inspection method according to claim 9, wherein the inspecting comprises:
   maintaining a width corresponding to an overlap area between the hole and a supersonic wave emitting surface of the probe in a range of 0.1 mm to 2 mm.

* * * * *